(No Model.)

L. P. FAUGHT.
Manufacture of Manila and other Straw and Plaited Hats.

No. 236,316.  Patented Jan. 4, 1881.

Witnesses:
Wm. S. Bellows
Henry A. Clark

Inventor,
L. P. Faught
By Brown Bros.
Attorneys.

N. PETERS, PHOTO-LITHOGRAPHER, WASHINGTON, D. C.

United States Patent Office.

LEMUEL P. FAUGHT, OF FOXBOROUGH, MASSACHUSETTS, ASSIGNOR OF ONE-HALF TO WILLIAM T. COOK, OF SAME PLACE.

MANUFACTURE OF MANILA AND OTHER STRAW AND PLAITED HATS.

SPECIFICATION forming part of Letters Patent No. 236,316, dated January 4, 1881.

Application filed December 1, 1880. (No model.)

*To all whom it may concern:*

Be it known that I, LEMUEL P. FAUGHT, of Foxborough, in the county of Norfolk and State of Massachusetts, have invented certain new and useful Improvements in the Manufacture of Manila and other Straw and Plaited Hats, of which the following is a full, clear, and exact description.

This invention relates to improvements in the manufacture of Manila and other straw and plaited hats which have their brims made of two thicknesses of material; and the invention consists in providing one of the thicknesses of the brim with a stiffener at its outer or edge portion which shall be capable of shaping to any curve under the heat and pressure of the hatter's iron, and in turning the outer or edge portion of the other thickness of the brim over and about the so stiffened edge of the one thickness of the brim, and there stitching or otherwise securing the same in place, all substantially as hereinafter described.

Figure 1:
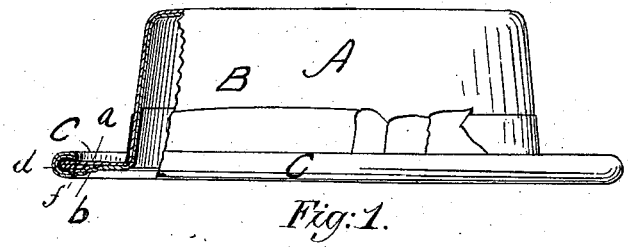
Figures 2, 3, 4, 5:
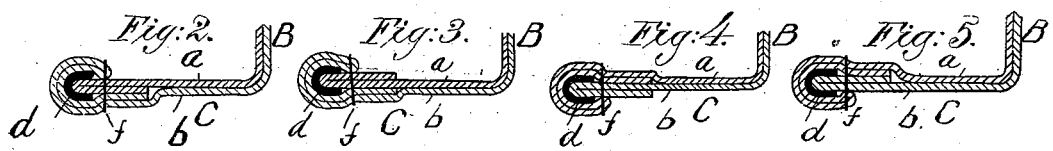
Figures 6, 7, 8, 9:
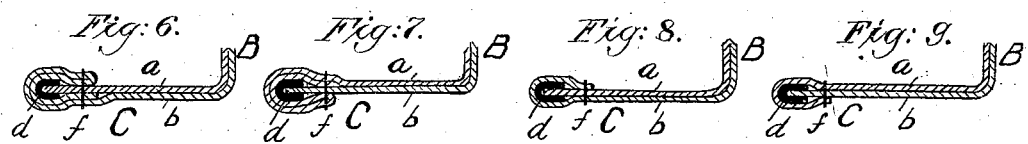
Figures 10, 11, 12, 13:
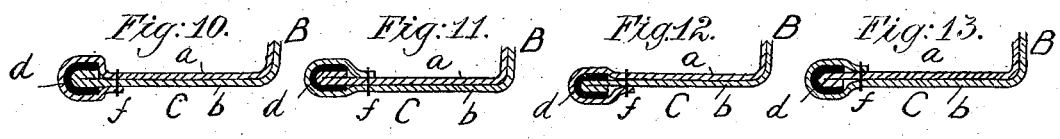

In the accompanying plate of drawings, Figure 1 is a view, in side elevation and partial section, of a hat embodying this invention; Fig. 2, an enlarged section of the brim. The other figures represent similar views to Fig. 2, but showing modifications of the invention.

Figures 14, 15, 16, 17:
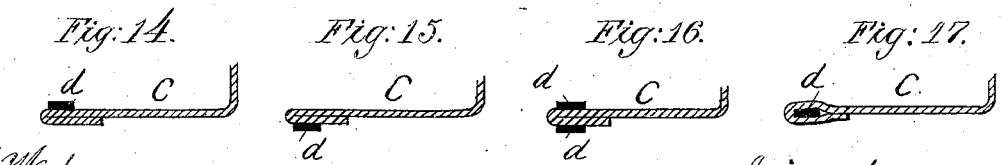

In the drawings, A represents a Manila or other straw or plaited hat, of which B is the crown and C the brim. The brim C is in two thicknesses or layers, $a$ and $b$, both of which are continuous of the crown B. The outer portion or edge of one of the thicknesses of the brim C is provided with a stiffener, $d$, by attaching it thereto by stitches or in any other suitable manner. This stiffener is made of a strip of suitable width of cotton, woolen, or linen, or other fibrous material or materials, such as felt, cloth, or paper, which is saturated or impregnated or coated, with on one or both of its sides, or otherwise has incorporated in it or in its fibers or threads, gum-shellac, or any preparation thereof, or any suitable stiffening gum or material which will impart to it the quality of being susceptible of a change in shape or position under the treatment of the hatter's iron, heated dies, steam, or atmospheric evaporation when attached to the brim as aforesaid. And this attachment to the brim may be either upon and along either its upper or its under side, near its edge, as shown in Figs. 14 and 15, respectively, of the drawings, or upon both its under and its upper sides, as shown in Fig. 16, or upon both its under and its upper sides and about its edge, as shown in Figs. 1 to 13, inclusive, or between the folds of its folded and doubled portion, as shown in Fig. 17. With the stiffener-strip $d$ thus secured and located, the outer portion or edge of the other and remaining thickness of the brim is turned over and about it, as shown in the various figures of the drawings, and then there secured by stitching it, as at $f$, or otherwise, in any suitable manner to the thickness of the brim, about and over the edge of which it was turned, as aforesaid.

In Figs. 1, 2, 3, 6, 8, 11, and 13 the edge portion $b$ of the brim C is turned over the other edge portion, $a$, and in Figs. 4, 5, 7, 9, 10, and 12 the edge portion $a$ is turned over the edge portion $b$.

The edge of the brim to which the stiffener is attached may be doubled or folded upon itself, as shown in Figs. 1 to 5, inclusive, and Figs. 10 to 16, inclusive, before the outer is turned over and secured to it, as described, or it may have the stiffener applied to it without folding it, as shown in Figs. 6, 7, 8, and 9. After having arranged and prepared the two portions of the brim of the hat, as described, obviously the brim may be curled or shaped by the hatter's iron in the ordinary mode of using such irons, and when such operation is completed the brim will retain such shape and stiffness in use and wear. This folding of the one edge of the brim over the edge to which the stiffener is applied conceals the same with the material of which the hat is composed, obviously giving a neat, continuous, and finished appearance to the brim.

I am aware that a stiffener to hats such as herein described has been employed in a hat with two thicknesses of brim, and that the turning or doubling of the edge or edges of such thicknesses of the brim are separately not new, but have been before patented, and therefore I lay no claim to them separately; but What I do claim is—

A Manila or other straw or plaited hat as a new article of manufacture, having its brim in two thicknesses, $a$ $b$, and a stiffener, $d$, applied to one of its thicknesses, and the other thickness turned and folded about such stiffened thickness and secured thereto, all substantially as described.

In testimony whereof I have hereunto set my hand in the presence of two subscribing witnesses.

LEMUEL P. FAUGHT.

Witnesses:
EDWIN W. BROWN,
W. S. BELLOWS.